(12) United States Patent
Sachs et al.

(10) Patent No.: US 7,349,822 B2
(45) Date of Patent: Mar. 25, 2008

(54) SLIDE PAD SYSTEM AND METHOD

(75) Inventors: Todd S. Sachs, Palo Alto, CA (US); Jonah Harley, Mountain View, CA (US); Dale Schroeder, Scotts Valley, CA (US)

(73) Assignee: Avago Technologies ECBU IP Pte Ltd., Singapore (SG)

( * ) Notice: Subject to any disclaimer, the term of this patent is extended or adjusted under 35 U.S.C. 154(b) by 0 days.

(21) Appl. No.: 11/021,290

(22) Filed: Dec. 23, 2004

(65) Prior Publication Data

US 2006/0142970 A1    Jun. 29, 2006

(51) Int. Cl.
*G06F 15/00* (2006.01)
*G09G 5/00* (2006.01)

(52) U.S. Cl. .................................... 702/150
(58) Field of Classification Search ............. 702/94, 702/95, 150, 151, 154; 345/10, 14, 156, 345/157, 184
See application file for complete search history.

(56) References Cited

U.S. PATENT DOCUMENTS

| | | | |
|---|---|---|---|
| 4,794,393 A * | 12/1988 | Imran | 340/870.37 |
| 5,479,191 A | 12/1995 | Komatsu | |
| 5,673,066 A | 9/1997 | Toda et al. | |
| 5,961,574 A * | 10/1999 | Woodfield | 708/141 |
| 6,094,190 A | 7/2000 | Kodim | |
| 6,243,080 B1 | 6/2001 | Molne | |
| 6,351,657 B2 | 2/2002 | Yamada | |
| 6,430,023 B1 * | 8/2002 | Suzuki | 361/290 |
| 6,646,631 B2 * | 11/2003 | Suzuki et al. | 345/157 |
| 6,650,314 B2 | 11/2003 | Philipson | |
| 6,801,191 B2 * | 10/2004 | Mukai et al. | 345/179 |
| 2002/0130273 A1 * | 9/2002 | Gordon et al. | 250/491.1 |
| 2004/0212586 A1 | 10/2004 | Denny | |
| 2005/0110755 A1 * | 5/2005 | Harley et al. | 345/160 |

FOREIGN PATENT DOCUMENTS

| | | | |
|---|---|---|---|
| DE | 10 2005 052 292 | * | 7/2006 |
| EP | 1164698 | | 12/2001 |
| GB | 2247938 | | 3/1992 |
| GB | 2321108 | | 7/1998 |
| JP | 8030392 A | | 2/1996 |
| JP | 018123613 A | | 5/1996 |
| WO | WO2005/055032 | | 6/2005 |

OTHER PUBLICATIONS

The GB Search Report for Application No. GB0524055.1 mailed on Jun. 21, 2006.
The GB Search Report for Application No. GB0524055.1 mailed on Mar. 24, 2006.

* cited by examiner

*Primary Examiner*—Michael Nghiem (57) ABSTRACT

A method performed by a slide pad system is provided. The method includes generating a first direction measurement using a first capacitance measurement, generating a calibration measurement using a second capacitance measurement, and computing a first position using the first direction measurement and the calibration measurement. A system including a slide pad including a slide disk, a sense module, and a control module is also provided.

24 Claims, 6 Drawing Sheets

SLIDE PAD SYSTEM AND METHOD

BACKGROUND

Various input devices exist for navigating a pointer in a display. Examples of such devices include a mouse, a joystick, and a touchpad. These devices receive inputs from a user and, in conjunction with a host, translate the inputs to move the pointer within the display. The input devices may also have a selection mechanism such as a button to allow the user to perform functions in the display.

Each type of input device may serve a useful function in allowing a user to interact with a host device. Because of design constraints of a host such as a mobile telephone, a particular input device may not be suited for a particular host or type of user interaction with the host. For example, size limitations of a host may prevent the use of certain types of input devices. It would be desirable to provide an input device that provides as much functionality as possible for a host.

SUMMARY

One exemplary embodiment provides a method performed by a slide pad system. The method comprises generating a first direction measurement using a first capacitance measurement and computing a first position using the first direction measurement.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, a slide pad system and method are provided. The system includes a slide pad and a control unit. A user moves the slide pad in two directions (e.g., the x and y directions) to adjust a pointer location in a display device of a host and applies pressure the slide pad in a third direction (e.g., the z direction) to cause one or more functions to be performed. The control unit determines position information based on the movement of the slide pad in the first two directions, and determines a click state and finger pressure based on the applied pressure in the third direction. The control unit provides the position information and click state to a host.

Figure 1:
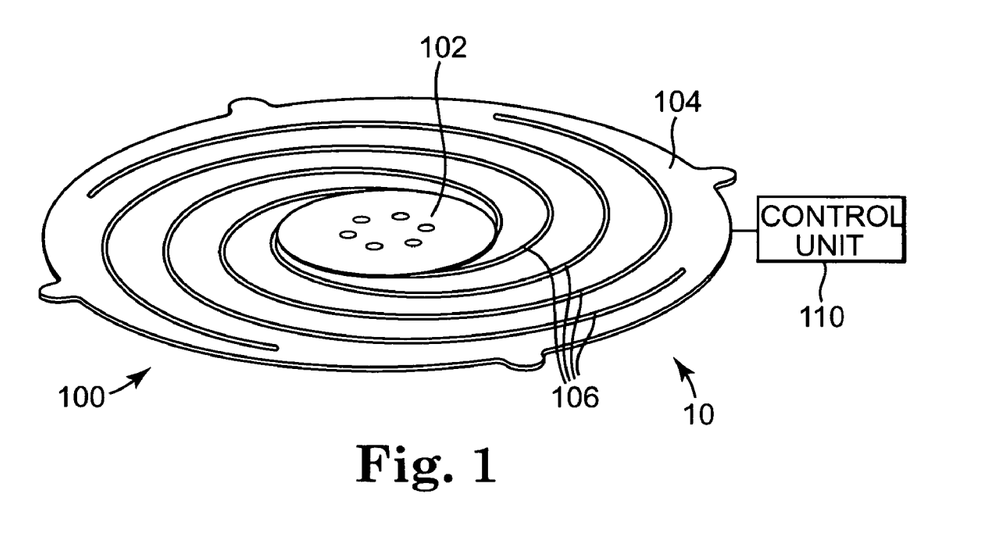
FIG. 1 is a schematic diagram illustrating one embodiment of a slide pad system.

FIG. 1 is a schematic diagram illustrating one embodiment of a slide pad system 10. Slide pad system 10 includes a slide pad 100 coupled, directly or indirectly, to a control unit 110. Slide pad 100 includes a slide disk 102, a frame 104, and a plurality of spring devices 106 connected, directly or indirectly, to slide disk 102 and frame 104.

Slide pad system 10 provides information to a host 220 (shown in FIG. 2) in response to inputs from a user. The user provides the inputs by moving slide disk 102 in two directions. These two directions are referred to herein as the x and y directions. Slide pad system 10 converts the inputs in the x and y directions to position information and provides the position information to host 220 to cause a pointer (e.g., a cursor) to be adjusted in a display device of host 220. The user also provides inputs by applying pressure in a third direction. The third direction is referred to herein as the z direction. Slide pad system 10 converts the inputs in the z direction to a click state and finger pressure information and provides the click state to host 220 to cause one or more functions to be performed by host 220.

Spring devices 106 operate to bias slide disk 102 toward a center position in the x and y directions. The user moves slide disk 102 within frame 104 by applying sufficient pressure on slide disk 102 in the x and/or y direction to overcome the resistance of spring devices 106. When the resistance of spring devices 106 exceeds the x and/or y direction pressure applied to slide disk 102 by the user (e.g., when the user releases the x and/or y direction pressure on slide disk 102), spring devices 106 cause slide disk 102 to return to or toward the center position in the x and y directions.

One or more internal spring device (not shown) operate to bias slide disk 102 toward a center position in the z direction. The internal spring device may comprise a bi-stable dome switch (not shown), for example. The user causes functions of the host to be performed by applying and/or releasing pressure on slide disk 102 in the z direction. For example, the user may apply and release pressure on slide disk 102 any number of times to cause one or mores clicks of varying durations to be performed. When the resistance of the internal spring devices exceeds the z direction pressure applied to slide disk 102 by the user (e.g., when the user releases the z direction pressure on slide disk 102), spring devices 106 cause slide disk 102 to return to or toward the center position in the z direction.

Control unit 110 measures the amount of movement of slide device 102 in the x, y, and z directions as will be described in additional detail below. From the measurements in the x and y directions, control unit 110 generates the position information and provides the position information to host 220. Host 220 adjusts the position of a pointer using the position information. From the measurements in the z direction, control unit 110 generates the click state and provides the click state to host 220. Host 220 causes one or more functions to be performed using the click state.

In one embodiment, slide pad system 10 operates according to one or more modes of operation. The modes of operation may include a mouse mode, a one-to-one mode, and a joystick mode.

In the mouse mode, slide pad system 10 outputs position information to cause the pointer of host 220 to be moved relative to the movement of slide disk 102 in the x and/or y directions. When the user allows slide disk 102 to return to the center position of the x and y directions, slide pad system 10 outputs position information to cause the pointer of host 220 to remain in place, i.e., not move back to a neutral position in the display of host 220.

In the one-to-one mode, slide pad system 10 outputs position information to cause the pointer of host 220 to track the movement of slide disk 102 in the x and/or y directions. When the user allows slide disk 102 to return to the center position of the x and y directions, slide pad system 10 outputs position information to cause the pointer of host 220 to move back to the neutral position in the display of host 220. The neutral position in the display corresponds to the center position of the x and y directions of slide pad system 10.

In the joystick mode, slide pad system 10 outputs position information to cause the pointer of host 220 to move in a direction and velocity based on the position of slide disk 102 in the x and/or y directions. The further the user moves slide disk 102 from the center position of the x and y directions, the faster the pointer is moved in the display of host 220. When the user allows slide disk 102 to return to the center position of the x and y directions (i.e., the zero direction and zero velocity position of slide pad system 10 in joystick mode), slide pad system 10 outputs position information to cause the pointer of host 220 to remain in place, i.e., not move back to a neutral position in the display of host 220.

In other embodiments, slide pad system 10 operates in other modes of operation or according to a single mode of operation.

Figure 2:
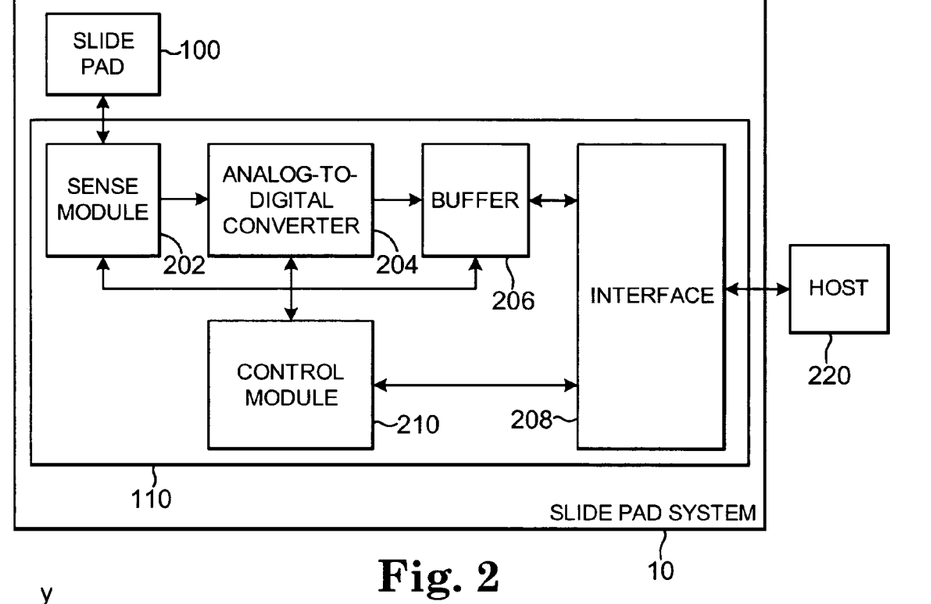
FIG. 2 is a block diagram illustrating one embodiment of a slide pad system coupled to a host.

FIG. 2 is a block diagram illustrating one embodiment of slide pad system 10 coupled, directly or indirectly, to host 220. Slide pad system 10 includes slide pad 100 and control unit 110. Control unit 110 includes a sense module 202, an analog-to-digital converter (ADC) 204, a buffer 206, an interface 208, and a control module 210.

Sense module 202 detects and generates the position and click state in analog form from slide pad 100 in response to control signals from control module 210. Sense module 202 provides the analog position and click state to ADC 204. ADC 204 converts the analog position and click state from sense module 202 to a digital form and stores the digital position and click state in buffer 206. Control module 210 processes the position and click state in buffer 206 and provides the processed position and click state in to host 220 using interface 208.

In one embodiment, control module 210 comprises a one or more processors (not shown) and firmware (not shown) configured to control the operation of control unit 110 including generating and processing the position and click state and providing the position and click state to host 220. The firmware is stored in a storage medium (not shown) accessible by the processor. The firmware may also be stored on other media including portable media such as a CD-ROM prior to being stored in the storage medium accessible by the processor. In other embodiments, control module 210 includes any other combination of hardware and/or software components.

Additional details of the operation of slide pad 100 and sense module 202 in generating the measurements in the x, y, and z directions will now be described with reference to FIGS. 3A, 3B, 4, and 5.

Figure 3A:
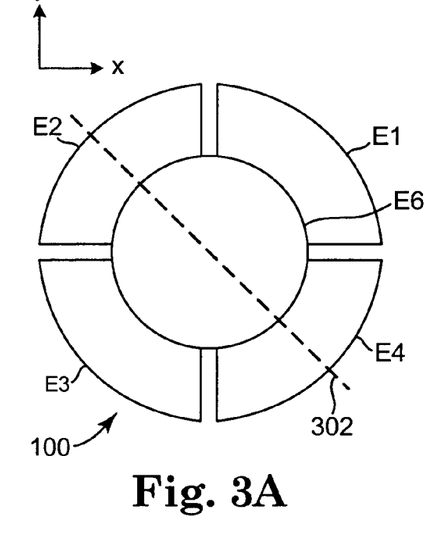
FIG. 3A is a schematic diagram illustrating one embodiment of a slide pad from a top perspective.
Figure 3B:
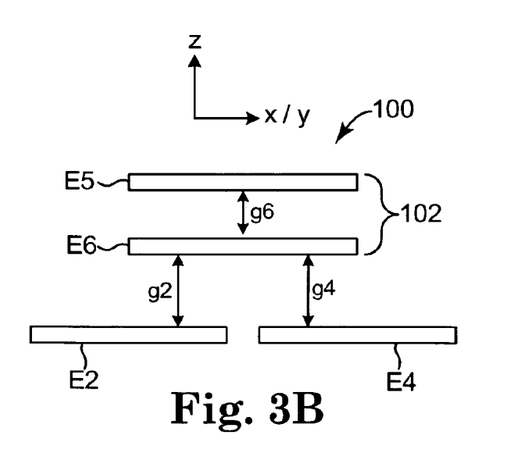
FIG. 3B is a schematic diagram illustrating one embodiment of cross-section of a slide pad.

FIG. 3A is a schematic diagram illustrating one embodiment of slide pad 100 from a top perspective. Slide pad 100 includes a disk-shaped electrode E6 that is moved by the user in the x and y directions with respect to electrodes E1, E2, E3, and E4. FIG. 3B is a schematic diagram illustrating one embodiment of a cross-section of slide pad 100 along an axis 302 shown in FIG. 3A. As shown in the cross-section in FIG. 3B, electrodes E2 and E4 are set in a first plane formed in the x and y directions. Electrodes E1 and E3 are also set in the first plane (not shown in FIG. 3B). Electrode E6 is set in a second plane formed in the x and y directions such that the second plane is displaced from the first plane as indicated by a gap g2 between electrodes E6 and E2 and a gap g4 between electrodes E6 and E4.

Slide pad 100 also includes an electrode E5 that is moved by the user in the z direction with respect to electrode E6. The combination of electrodes E5 and E6 form slide disk 102 such that electrodes E5 and E6 are moved in unison in the x and y directions by the user. Electrode E5 is set in a third plane formed in the x and y directions such that the third plane is displaced from the second plane as indicated by a gap g6 between electrodes E6 and E5.

In other embodiments, electrode E5 is omitted and the click state and finger pressure are derived from the distance between electrode E5 and electrodes E1 through E4.

Figure 4:
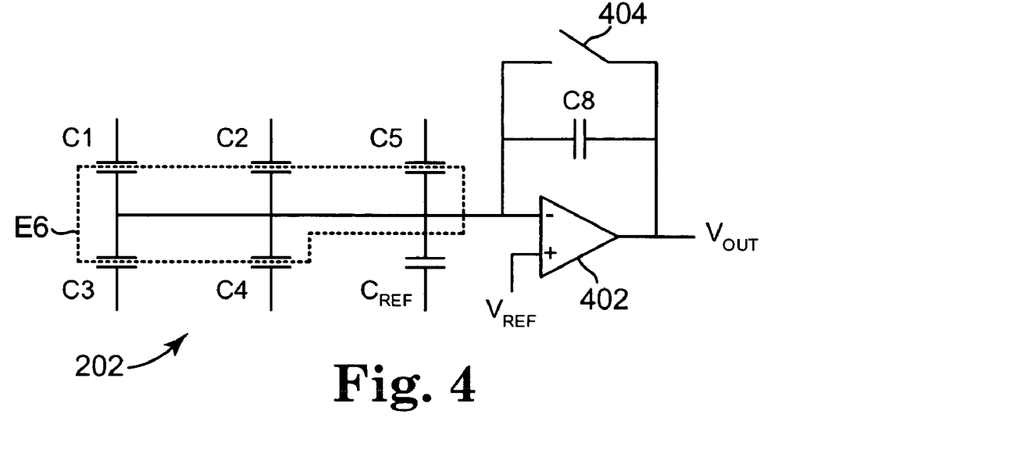
FIG. 4 is a schematic diagram illustrating one embodiment of a sense module.

FIG. 4 is a schematic diagram illustrating one embodiment of sense module 202. In the embodiment of FIG. 4, sense module 202 generates analog position information in response to the position of electrode E6 with respect to electrodes E1, E2, E3, and E4 by measuring the capacitances between electrodes E1, E2, E3, and E4 and electrode E6. These capacitances are represented by capacitors C1, C2, C3, and C4, respectively. Sense module 202 also generates an analog click state in response to the position of electrode E6 with respect to electrode E5 by measuring the capacitance between electrode E5 and electrode E6. This capacitance is represented by capacitor C5.

Sense module 202 also includes a reference capacitor, $C_{REF}$, an op-amp 402, a capacitor C8, and a switch 404. Capacitors C1, C2, C3, C4, C5, and $C_{REF}$ couple to the inverted input of op-amp 402. Capacitor C8 and switch 404 are coupled in parallel between the inverted input of op-amp 402 and the output of op-amp 402, $V_{OUT}$. The non-inverted input of op-amp 402 couples to a reference voltage, $V_{REF}$.

Sense module 202 generates the analog position information and click state in response to control signals from control module 210. Sense module 202 provides the analog position information and click state to ADC 204. ADC 204 converts the analog position information and click state into a digital form processable by control module 210 and stores the digital position information and click state in buffer 206.

The capacitance between electrode 6 and electrode E1, E2, E3, E4, or E5 is calculated according to the following equation.

$$C = \frac{\varepsilon_0 A}{g} \quad (1)$$

where:

C=capacitance in Farads
$\varepsilon_0$=the coefficient of permittivity equal to $8.85 \times 10^{-12}$ Farads per meter
A=the area of overlay between the electrodes in meters$^2$
g=the gap width in meters From equation 1, the capacitance between electrode 6 and electrode E1, E2, E3, or E4 varies directly with how much area in sliding disk 102 (i.e., electrode 6) overlaps with a particular sense electrode E1, E2, E3, E4, or E5, and varies inversely with the distance between sliding disk 102 (i.e., electrode 6) and a particular sense electrode E1, E2, E3, E4, or E5. With each sense electrode E1, E2, E3, and E4, the area of overlap with sliding disk 102 increases or decreases as a user moves slide disk 102. With electrodes E5 and E6 (referred to collectively hereafter as the finger sensor), the gap between electrodes E5 and E6 increases or decreases with the finger pressure applied by the user.

To measure the capacitance of a capacitor C1 through C5 or $C_{REF}$, control module 210 causes switch 404 to be closed to force electrode 6 and the output voltage to the reference voltage. Control module 210 then causes switch 404 to be opened and causes a high voltage $V_n$, where n indicates a capacitor C1 through C5 or $C_{REF}$, to be applied to an electrode of capacitor C1 through C5 or $C_{REF}$. Charge, Q, develops across the driven capacitor C1 through C5 or $C_{REF}$ according to the following equation.

$$Q_n = C_n(V_n - V_{REF}) \quad (2)$$

Because charge cannot move onto or off of electrode 6, control module 210 causes op-amp 402 to apply a voltage across capacitor C8 to keep electrode 6 at the reference voltage. Thus, the capacitance of a capacitor C1 through C5 is determined from the following equations.

$$V_{OUT} - V_{REF} = C_n/C_{REF}(V_{REF} - V_n) \quad (3)$$

$$C_n = (V_{OUT} - V_{REF}) \cdot C_{REF}/(V_{REF} - V_n) \quad (4)$$

By sequentially making measurements on each of the driven electrodes of capacitor C1 through C5 and $C_{REF}$, control module 210 calculates the capacitances of capacitors C1 through C5 using sense module 202.

Without taking the gap between electrode E6 and electrodes E1-E4 into account, position information for the x-position and the y-position may be derived from the capacitances of capacitors C1 through C4 according to the following equations.

$$x\text{-position} \propto (C2+C3)-(C1+C4) \quad (5)$$

$$y\text{-position} \propto (C1+C2)-(C3+C4) \quad (6)$$

For the x-position, control module 210 causes electrodes 2 and 3 to be driven high and electrodes 1 and 4 to be driven low to perform the subtraction measurement in equation 5. For the y-position, control module 210 causes electrodes 1 and 2 to be driven high and electrodes 3 and 4 to be driven low to perform the subtraction measurement in equation 6. For both the x and y-position subtraction measurements, the measured output capacitance is proportional to the movement of sliding disk 102 in the respective directions subject to a gain constant governing the sensitivity of motion of slide pad system 10. By combining equation 1 with equations 5 and 6, respectively, equations 7 and 8 may be derived.

$$x\text{-position} \propto \left(\frac{\varepsilon_0}{g}\right)(A2+A3)-(A1+A4) \quad (7)$$

$$y\text{-position} \propto \left(\frac{\varepsilon_0}{g}\right)(A1+A2)-(A3+A4) \quad (8)$$

As shown in equations 7 and 8, the subtraction measurements vary with the gap between electrode 6 and electrodes 1 through 4. The gap may vary in response to the amount of finger pressure applied to slide disk 102 by the user. Control module 210 causes sense module 202 to detect the sum of the capacitances of capacitors C1, C2, C3, and C4, referred to as a calibration measurement, as shown in the following equation.

$$C_{SUM} = C1+C2+C3+C4 = \left(\frac{\varepsilon_0}{g}\right)(A1+A2+A3+A4) \quad (9)$$

By combining equation 9 with equations 5 and 6, respectively, equations 10 and 11 may be derived.

$$x\text{-position} \propto ((C2+C3)-(C1+C4))/C_{SUM} \quad (10)$$

$$y\text{-position} \propto ((C1+C2)-(C3+C4))C_{SUM} \quad (11)$$

Similarly, equations 12 and 13 may be derived by combining equation 9 with equations 7 and 8, respectively, to provide a measurement that is independent of the gap between electrode E6 and electrodes E1 through E4.

$$x\text{-position} \propto \left(\frac{(A2+A3)-(A1+A4)}{(A1+A2+A3+A4)}\right) \quad (12)$$

$$y\text{-position} \propto \left(\frac{(A1+A2)-(A3+A4)}{(A1+A2+A3+A4)}\right) \quad (13)$$

In one embodiment, control module 210 generates the calibration measurement of equation 9 using sense module 202 as follows. Control module 210 causes switch 404 to be closed to drive the output voltage to the reference voltage. Control module 210 then causes two of the electrodes (e.g., electrodes E1 and E3) to be driven high and causes the voltage V1 from equation 14 to be stored.

$$V1 = V_{OUT1} - V_{REF} \quad (14)$$

Control module 210 then causes the high voltage to be removed from the first two electrodes, causes the other two electrodes (e.g., electrodes E2 and E4) to be driven low, and causes the voltage V2 from equation 15 to be stored.

$$V2 = V_{OUT2} - V_{OUT1} \quad (15)$$

Control module 210 calculates the calibration measurement using equation 16.

$$C_{SUM} \propto V2-V1 \quad (16)$$

In other embodiments, control module 210 generates the calibration measurement of equation 9 by driving capacitors C1 through C4 high simultaneously. In these embodiments, the reference capacitor is designed such that it is driven low and prevents the output voltage from railing when capacitors C1 through C4 are driven high simultaneously.

Figure 5:
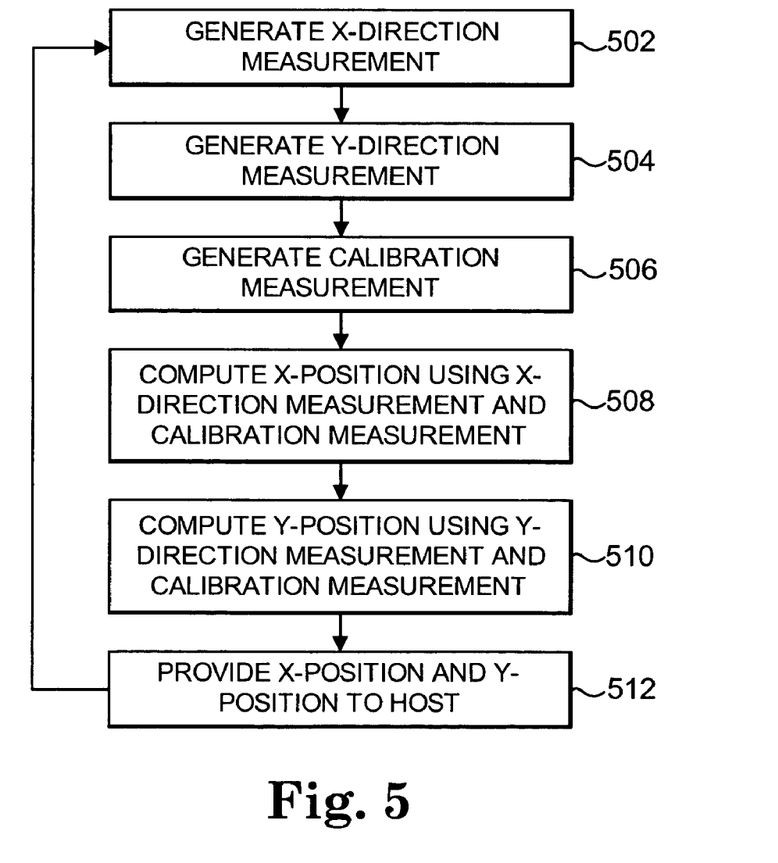
FIG. 5 is a flow chart illustrating one embodiment of a method for generating position information with a slide pad system.

FIG. 5 is a flow chart illustrating one embodiment of a method for generating position information with slide pad system 10. The method of FIG. 5 may be implement using system pad system 10 as shown in FIG. 2.

In FIG. 5, control module 210 generates an x-direction measurement as indicated in a block 502. In one embodiment, control module 210 generates the x-direction measurement using equation 5 as described above. Control module 210 generates a y-direction measurement as indicated in a block 504. In one embodiment, control module 210 generates the y-direction measurement using equations 6 as described above. Control module 210 generates a calibration measurement as indicated in a block 506. In one embodiment, control module 210 generates the calibration measurement using equation 9 as described above.

Control module 210 computes an x-position using the x-direction measurement and the calibration measurement as indicated in a block 508. In one embodiment, control module 210 generates the x-position using equation 10. Control module 210 computes a y-position using the y-direction measurement and the calibration measurement as indicated in a block 510. In one embodiment, control module 210 generates the y-position using equation 11.

Control module 210 provides the x-position and the y-position to the host as indicated in a block 512. The x-position and the y-position comprise position information.

The method of FIG. 5 may be repeated either continuously in cycles (e.g., 120 Hz) or at selected times generate updated position information and provide the updated position information to host 220. The click state may be generated along with the position information in each cycle.

Control module 210 adjusts the position information in accordance with the finger pressure on slide disk 102 as derived from the finger sensor, i.e., electrodes E5 and E6, in selected circumstances. In particular, control module 210 adjusts the position information in the mouse mode of operation in response to comparing the finger pressure to two or more thresholds to minimize snap-back of the pointer in the display of host 220 as described below with reference to FIGS. 6 and 7. In addition, control module 210 adjusts the position information in the one-to-one mode of operation in response to comparing the finger pressure to two or more thresholds to minimize inaccurate clicks by the user as described below with reference to FIGS. 8 and 9.

Figure 6:
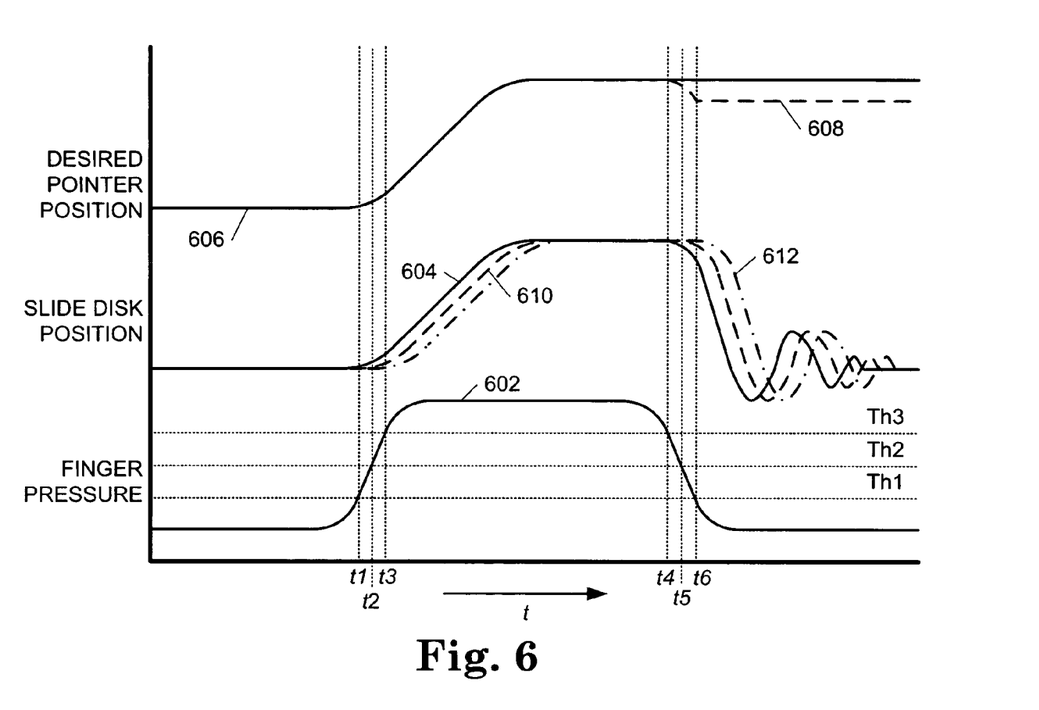
FIG. 6 is a graph illustrating an example of finger pressure and pointer position in a slide pad system.

FIG. 6 is a graph illustrating an example of finger pressure and a desired pointer position in slide pad system 10. In FIG. 6, a graph 602 illustrates the level of finger pressure on slide disk 102 over time, a graph 604 illustrates the position of slide disk 102 over time, and a graph 606 illustrates the desired pointer position in a display of host 220 that corresponds to the finger pressure shown in graph 602 over time.

In the mouse mode of operation, slide pad system 10 attempts to cause the pointer in the display of host 220 to remain in place, i.e., freeze, in response to a user releasing slide disk 102. By freezing the pointer, an undesirable snap-back of the pointer may be minimized. Snap-back occurs where the pointer moves in response to slide disk 102 re-centering in slide pad system 10 after being released by user. An example of undesirable snap-back is shown as dotted line graph portion 608 where the pointer moves beginning at time t3 in response to slide disk 102 being released by user just prior to time t3. As a result, the pointer ends up displaced from the desired position.

To minimize snap-back, control module 210 adjusts position information based on the level of finger pressure applied to the finger sensor of slide disk 102. More particularly, control module 210 outputs delayed position information in response to selected levels of finger pressure on the finger sensor. For example, if the finger pressure is relatively low, i.e., the finger pressure is below a first threshold, TH1, in graph 602, then control module 210 outputs position information with a relatively long delay (e.g., two cycles). If the finger pressure is relatively moderate, i.e., the finger pressure is above the first threshold, TH1, and is below a second threshold, TH2, in graph 602, then control module 210 outputs position information with a relatively moderate delay (e.g., one cycle). If the finger pressure is relatively high, i.e., the finger pressure is above the second threshold, TH2, in graph 602, then control module 210 outputs position information with no delay.

Graphs 610 and 612 illustrate the effect of delayed position information. Graph 610 illustrates the slide disk position of graph 604 delayed by a first amount, e.g., one cycle. Graph 612 illustrates the slide disk position of graph 604 delayed by a second amount, e.g., two cycles.

Prior to time t1, the finger pressure is below the first threshold (i.e., the user is not touching slide disk 102) and control module 210 outputs position information to cause the pointer position to remain unchanged.

Between time t1 and time t2, the finger pressure is above the first threshold and below the second threshold and control module 210 outputs position information with a relatively long delay as shown in graph 612. Although graph 612 lags behind the desired pointer position in graph 606 in the period between time t1 and time t2, the lag is slight and for a relatively short duration.

Between time t2 and time t3, the finger pressure is above the second threshold and below the third threshold and control module 210 outputs position information with a relatively moderate delay as shown in graph 610 Although graph 610 lags behind the desired pointer position in graph 606 in the period between time t2 and time t3, the lag is slight and for a relatively short duration.

Between time t3 and time t4, the finger pressure is above the second threshold and control module 210 outputs position information with a no delay as shown in graph 604. In the period between time t3 and time t4, graph 604 closely tracks the desired pointer position in graph 606.

Between time t4 and time t5, the user begins to release slide disk 102. As a result, the finger pressure is above the second threshold and below the third threshold and control module 210 outputs position information with a relatively moderate delay as shown in graph 610 By delaying the output of the position information, the pointer position closely tracks the desired pointer position in graph 606.

Between time t5 and time t6, the user finishes releasing slide disk 102. As a result, the finger pressure is above the first threshold and below the second threshold and control module 210 outputs position information with a relatively long delay as shown in graph 612. By further delaying the output of the position information, the pointer position closely tracks the desired pointer position in graph 606 until control module 210 confirms that the user has released slide disk 102 and begins maintaining the output of the position information to freeze the position of the pointer in the display of host 220.

Subsequent to time t6, the finger pressure is below the first threshold (i.e., the user is not touching slide disk 102) and control module 210 outputs position information to cause the pointer position to remain unchanged.

Figure 7:
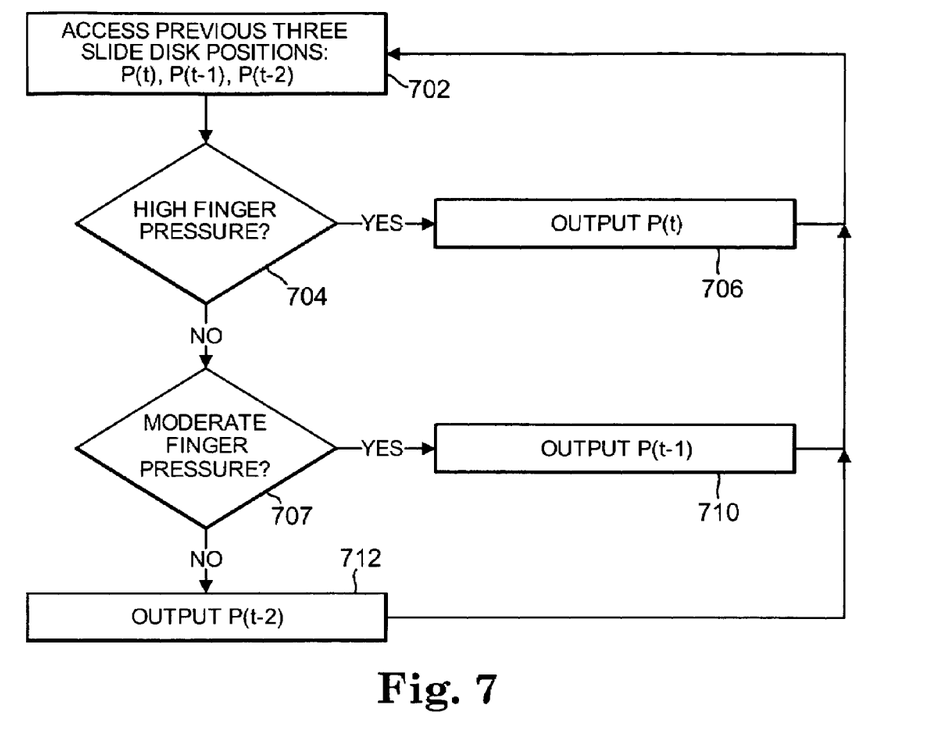
FIG. 7 is a flow chart illustrating one embodiment of a method for reducing snap-back with a slide pad system.

FIG. 7 is a flow chart illustrating one embodiment of a method for reducing snap-back with a slide pad system. In FIG. 7, control module 210 accesses three previous slide disk positions P(t), P(t-1), and P(t-2) from buffer 206 as indicated in a block 702. The position P(t) represents the current position information, the position P(t-1) represents position information prior to the current position information, and the position P(t-2) represents position information prior to the position information P(t-1).

A determination is made by control module 210 as to whether there is high finger pressure on slide disk 102 as indicated in a block 704. If there is high finger pressure on slide disk 102, then control module 210 outputs slide disk position P(t) to host 220 as indicated in a block 706.

If there is not high finger pressure on slide disk 102, then a determination is made by control module 210 as to whether there is moderate finger pressure on slide disk 102 as indicated in a block 704. If there is moderate finger pressure on slide disk 102, then control module 210 outputs slide disk position P(t-1) to host 220 as indicated in a block 710. If there is not moderate finger pressure on slide disk 102, then control module 210 outputs slide disk position P(t-2) to host 220 as indicated in a block 712.

In other embodiments, more than two thresholds may be used where each threshold corresponds to a different amount of delay of outputting the position information.

The method of FIG. 7 may be repeated either continuously in cycles (e.g., 120 Hz) or at selected times generate updated position information and provide the updated position information to host 220. The click state may be generated along with the position information in each cycle.

Figure 8:
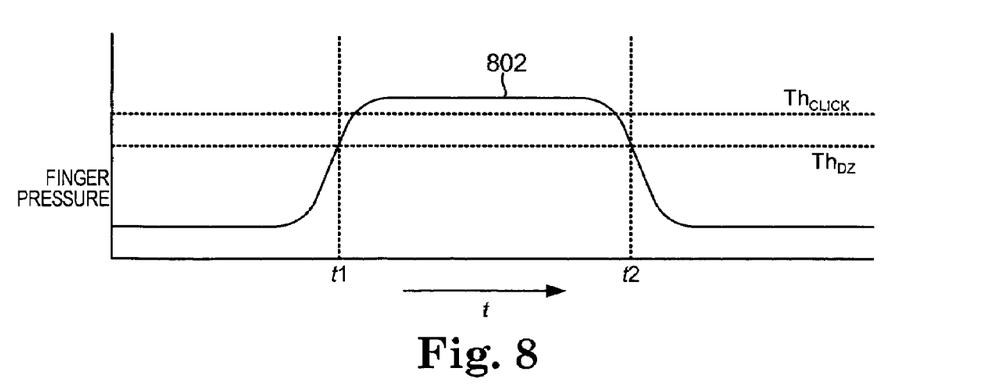
FIG. 8 is a graph illustrating an example of finger pressure in a slide pad system.

FIG. 8 is a graph illustrating an example of finger pressure in a slide pad system. In FIG. 8, a graph 802 illustrates the level of finger pressure on slide disk 102 over time where a user clicks slide disk 102.

Slide pad system 10 attempts to cause the pointer in the display of host 220 to remain in place, i.e., freeze, in response to a user clicking slide disk 102. By freezing the pointer, an undesirable mis-clicking may be prevented where the pointer moves slightly away from a position in which the user attempted to click. To freeze the pointer, control module 210 outputs position information to cause the pointer to remain in place in the display of host 220 in response to the finger pressure exceeding a first threshold, $Th_{DZ}$. In the example of FIG. 8, control module 210 freezes the pointer during the period between t1 and t2. During this period, control module 210 determines whether a click occurs. A click occurs when the finger pressure exceeds a second threshold, $Th_{CLICK}$. Whether or not a click occurs, the position of slide disk 102 may become mis-registered from the pointer position in the one-to-one mode of operation during the period between t1 and t2. The mis-registration may occur due to movement of the slide disk in the x and/or y directions between t1 and t2. The mis-registration may not become evident until the user moves slide disk 102 or releases slide disk 102 back to the center position in the x and y directions after t2.

Figure 9:
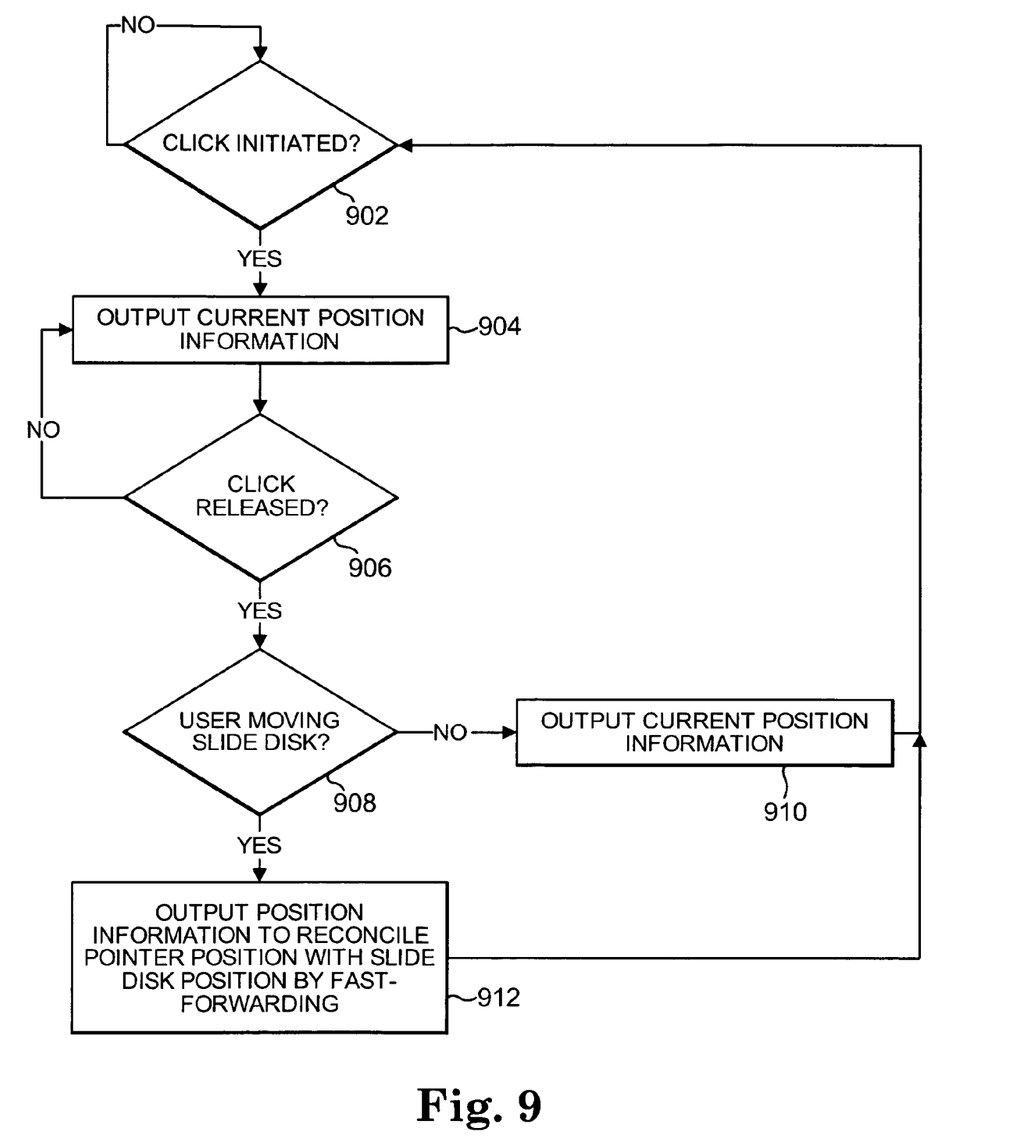
FIG. 9 is a flow chart illustrating one embodiment of a method for reducing pointer mis-registration with a slide pad system.

The method of FIG. 9 may be used to reconcile the mis-registration. FIG. 9 is a flow chart illustrating one embodiment of a method for reducing pointer mis-registration with slide pad system 10. In FIG. 9, a determination is made by control module 210 as to whether a click has been initiated as indicated in a block 902. If a click has not been initiated, then the function of block 902 is repeated.

If a click has been initiated, then control module 210 outputs the current position information as indicated in a block 904. A determination is made by control module 210 as to whether the click is released as indicated in a block 906. If the click is not released, then the function of block 904 is repeated.

If the click is released, then a determination is made by control module 210 as to whether the user is moving sliding disk 102 as indicated in a block 908. If the user is not moving sliding disk 102, then control module 210 outputs the current position information as indicated in a block 910. If the user is moving sliding disk 102, then control module 210 outputs position information to reconcile the position of the pointer with the position of slide disk 102 by fast-forwarding as indicated in a block 912.

Control module 210 causes the pointer to be fast-forwarded by outputting intermediate position information between the click location where the pointer was frozen and the desired current location of the pointer based on the current position of slide disk 102.

In one embodiment, the intermediate position information comprises position information from previous cycles of slide pad system 10. For example, if the current position of slide disk 102 is P(t) and the pointer was frozen using position P(t-9), then control module 210 outputs selected position information between P(t-9) and P(t) to cause the pointer position to be reconciled with the position of slide disk 102. Rather than outputting position P(t) immediately after P(t-9) which may cause the pointer to jump between positions in the display of host 220, control module 210 outputs position P(t-6) after position P(t-9), outputs position P(t-3) after position P(t-6), and outputs position P(t) after position P(t-3). By doing so, control module 210 fast-forwards the pointer between the frozen position and the current position without jumping the pointer and while reducing lag associated with outputting each position between the frozen position and the current position.

In other embodiments, the intermediate position information may be derived from the frozen position and the current position in other ways, e.g., by interpolation.

In one embodiment, control module 210 also causes the pointer to be fast-forwarded by outputting intermediate position information between the click location where the pointer was frozen and the desired current location of the pointer based on the current position of slide disk 102 prior to the user releasing the click. Where the user initiates the click, holds the click, and moves slide disk 102 significantly while holding the click, control module 210 begins reconciling the position of the pointer with the position of slide disk 102 prior to the click being released by fast-forwarded as described above. Control module 210 detects that slide disk 102 is moved significantly in response to detecting movement of slide disk 102 above a threshold.

The method of FIG. 9 may be repeated either continuously in cycles (e.g., 120 Hz) or at selected times generate updated position information and provide the updated position information to host 220. The click state may be generated along with the position information in each cycle.

In one embodiment, the algorithm described above with reference to FIGS. 6 and 7 may be used in conjunction with the algorithms described above with reference to FIGS. 8 and 9. More particularly, control module 210 may begin delaying the output of position information based on one or more thresholds above the threshold $Th_{DZ}$ prior to freezing the pointer. The amount of delay may increase with increasing finger pressure on slide disk 102 above the threshold $Th_{DZ}$.

Figure 10:
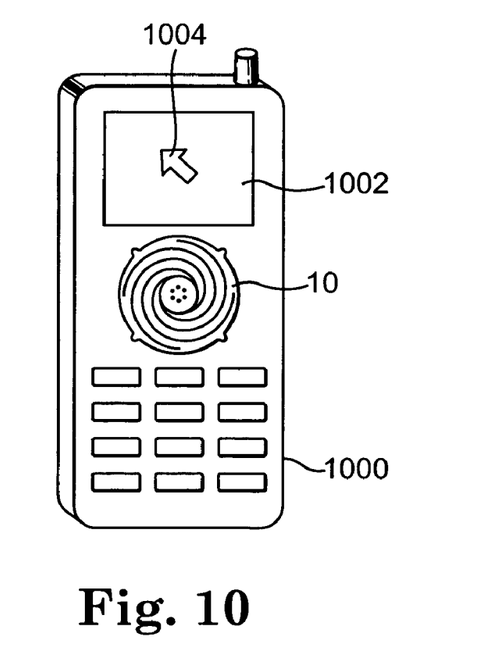
FIG. 10 is a schematic diagram illustrating one embodiment of a host that includes a slide pad system.

FIG. 10 is a schematic diagram illustrating one embodiment of a host 1000 that includes slide pad system 10. In the embodiment of FIG. 10, host 1000 comprises a cellular or mobile telephone that includes a display 1002 for displaying a cursor 1004. A user of host 1000 moves cursor 1004 in display 1002 using slide pad system 10 as described above.

In other embodiments, host 1000 comprises an electronic device configured to perform other functions.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a slide pad system, the method comprising:
   generating a first direction measurement using a first capacitance measurement;
   generating a calibration measurement using a second capacitance measurement;
   computing a first position using the first direction measurement and the calibration measurement;
   generating a second direction measurement using a third capacitance measurement;
   computing a second position using the second direction measurement and the calibration measurement; and
   providing the first position and the second position to a host.

2. The method of claim 1 further comprising:
   generating the first capacitance measurement by driving a first capacitor to a high voltage.

3. The method of claim 1 further comprising:
   generating the second capacitance measurement by driving a plurality of capacitors to a high voltage.

4. A system comprising:
   a first electrode disposed in a first plane; and
   a second electrode disposed in the first plane;
   a slide pad including a slide disk that includes a third electrode disposed in a second plane that is in parallel to the first plane;
   a sense module; and
   a control module;
   wherein the sense module is configured to provide first and second capacitance measurements associated with the position of the slide disk in the slide pad to the control module, wherein the second capacitance measurement represents a sum of the capacitances between the third electrode and the first and the second electrodes, wherein the control module is configured to generate a first direction measurement using the first capacitance measurement and the second capacitance measurement, and wherein the control module is configured to compute a first position using the first direction measurement.

5. The system of claim 4 wherein the sense module is configured to provide a third capacitance measurement associated with the position of the slide disk in the slide pad to the control module, wherein the control module is configured to generate a calibration measurement using the third capacitance measurement, and wherein the control module is configured to compute the first position using the calibration measurement.

6. The system of claim 4 further comprising:
   a first electrode disposed in a first plane;
   wherein the slide disk includes a second electrode disposed in a second plane that is in parallel to the first plane, and wherein the first capacitance measurement represents a first capacitance between the first electrode and the second electrode.

7. The system of claim 6 further comprising:
   a third electrode disposed in the first plane;
   wherein the sense module is configured to provide a third capacitance measurement associated with the position of the slide disk in the slide pad to the control module, wherein the third capacitance measurement represents a second capacitance between the third electrode and the second electrode, wherein the control module is configured to generate a second direction measurement using the third capacitance measurement, and wherein the control module is configured to compute a second position using the second direction measurement and the calibration measurement.

8. A method performed by a slide pad system that includes a slide disk, the method comprising:
   outputting first position information associated with the slide disk at a first time in response to an amount of pressure on the slide disk being below a first threshold;
   outputting second position information associated with the slide disk at a first time in response to the amount of pressure being above the first threshold and below a second threshold; or
   outputting third position information associated with the slide disk at a first time in response to the amount of pressure being above the second threshold,
   wherein the first position information indicates a first position of the slide disk at a second time that is prior to the first time, wherein the second position information indicates a second position of the slide disk at a third time that is subsequent to the second time, and wherein the third position information indicates a third position of the slide disk at a fourth time that is subsequent to the third time and prior to or the same as the first time.

9. The method of claim 8 further comprising:
   generating a plurality of capacitance measurements between a first electrode in the slide disk and a plurality of electrodes offset from the first electrode; and
   generating the first position information using the plurality of capacitance measurements.

10. The method of claim 8 further comprising:
    detecting the amount of pressure on the slide disk.

11. The method of claim 10 further comprising:
    generating a capacitance measurement between first and second electrodes in the slide disk; and
    detecting the amount of pressure on the slide disk using the capacitance measurement.

12. A system comprising:
    a slide pad including a slide disk; and
    a control unit;
    wherein the control unit is configured to provide first position information, second position information, or third position information to a host at a first time in response to an amount pressure applied to the slide disk, wherein the control unit is configured to provide the first position information in response to the amount of pressure applied to the slide disk being below a first threshold, wherein the control unit is configured to provide the second position information in response to the amount of pressure applied to the slide disk being above the first threshold and below a second threshold, and wherein the control unit is configured to provide the third position information in response to the amount of pressure applied to the slide disk being above the second threshold, and wherein the first position information indicates a first position of the slide disk in the slide pad at a second time that is prior to the first time, wherein the second position information indicates a second position of the slide disk in the slide pad at a third time that is subsequent to the second time, and wherein the third position information indicates a third position of the slide disk in the slide pad at a fourth time that is subsequent to the third time and prior to or the same as the first time.

13. The system of claim 12 wherein the slide disk comprises first and second electrodes disposed in parallel planes, and wherein the control unit is configured to detect the amount pressure applied to the slide disk according to a gap between the first and the second electrodes.

14. The system of claim 12 further comprising:
a buffer configured to store the first position information, the second position information, and the third position information.

15. A method performed by a slide pad system that includes a slide disk, the method comprising:
detecting a first amount of pressure on the slide disk at a first time;
outputting first position information associated with a first position of the slide disk subsequent to the first time and prior to a second time;
detecting a second amount of pressure on the slide disk at the second time;
subsequent to the second time, outputting second position information wherein the second position information is associated with a second position of the slide disk at a third time that is prior to the second time; and
subsequent to outputting the second position information, outputting third position information wherein the third position information is associated with a third position of the slide disk at the second time.

16. The method of claim 15 further comprising:
outputting the first position information prior to the first time.

17. The method of claim 15 wherein the second position information comprises intermediate position information.

18. The method of claim 17 further comprising:
interpolating the intermediate position information from the first position information and the third position information.

19. The method of claim 15 further comprising:
not outputting fourth position information associated with a fourth position of the slide disk at a fourth time that is prior to the second time.

20. A system comprising:
a slide pad including a slide disk; and
a control unit;
wherein the control unit is configured to provide first position information associated with a first position of the slide disk in the slide pad to a host subsequent to a first time in which an amount pressure applied to the slide disk exceeds a first threshold, wherein the control unit is configured to provide second position information associated with a second position of the slide disk in the slide pad to the host subsequent to a second time at which either the amount of pressure applied to the slide disk falls below the first threshold or movement of the slide disk in the slide pad above a second threshold is detected, and wherein the control unit is configured to provide third position information associated with a third position of the slide disk in the slide pad at the second time subsequent to providing the second position information.

21. The system of claim 20 wherein the amount pressure applied to the slide disk exceeds a third threshold between the first time and the second time.

22. The system of claim 20 wherein the second position information comprises intermediate position information.

23. The system of claim 22 wherein the control unit is configured to interpolate the intermediate position information from the first position information and the third position information.

24. The system of claim 20 further comprising:
a buffer configured to store the first position information, the second position information, and the third position information.

* * * * *